US012571929B2

(12) United States Patent
Xue et al.

(10) Patent No.: US 12,571,929 B2
(45) Date of Patent: Mar. 10, 2026

(54) MULTI-MODE SURFACE-WAVE FREE-FIELD INVERSION METHOD BASED ON DISPERSION PROPERTIES OF LAYERED MEDIA

(71) Applicant: DALIAN UNIVERSITY OF TECHNOLOGY, Dalian (CN)

(72) Inventors: Yaohui Xue, Dalian (CN); Zhiqian Dong, Dalian (CN); Gang Li, Dalian (CN); Dinghao Yu, Dalian (CN); Yaozhong Cui, Dalian (CN); Hongnan Li, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 211 days.

(21) Appl. No.: 18/641,019

(22) Filed: Apr. 19, 2024

(65) Prior Publication Data

US 2025/0138209 A1 May 1, 2025

(30) Foreign Application Priority Data

Nov. 1, 2023 (CN) ......................... 202311451278.6

(51) Int. Cl.
*G01V 1/30* (2006.01)
*G01V 1/28* (2006.01)

(52) U.S. Cl.
CPC .............. *G01V 1/303* (2013.01); *G01V 1/282* (2013.01); *G01V 1/307* (2013.01); *G01V 2210/6222* (2013.01)

(58) Field of Classification Search
CPC ........ G01V 1/303; G01V 1/282; G01V 1/307; G01V 2210/6222; G01V 1/28; G01V 1/32; Y02T 90/00; G06F 17/16
See application file for complete search history.

(56) References Cited

U.S. PATENT DOCUMENTS

2025/0138209 A1* 5/2025 Xue ....................... G01V 1/303

FOREIGN PATENT DOCUMENTS

CN 110688607 A * 1/2020 ............. G06F 17/10
CN 111045076 A * 4/2020 ............. G01V 1/282

(Continued)

*Primary Examiner* — Daniel Pihulic

(74) *Attorney, Agent, or Firm* — Muncy, Geissler, Olds & Lowe, P.C.

(57) ABSTRACT

A multi-mode surface-wave free-field inversion method based on dispersion properties of layered media addresses the inaccuracy in existing methods that ignore higher modes. A novel approach for characterizing the participation quantity of each mode is proposed based on an energy flux density, which is applied to calculate a modal participation factor through dispersion curves and the frequency-domain dynamic stiffness matrix. Next, the ground surface-wave components with dispersion properties are transferred from the time domain to the frequency domain and decomposed into harmonic components composed of individual frequencies by the Fast Fourier Transform technology. These harmonic components continue to be decoupled as multiple modes by the modal participation factors, with each single-mode component being inverted to construct single-mode surface-wave free fields. Finally, all single-mode surface-wave free fields are superimposed following the mode superposition principle to form the multi-mode surface-wave free fields.

3 Claims, 1 Drawing Sheet

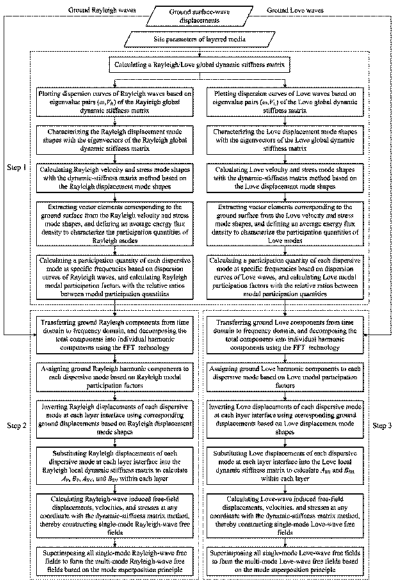

(56) References Cited

FOREIGN PATENT DOCUMENTS

| | | | | | |
|---|---|---|---|---|---|
| CN | 117518265 A | * | 2/2024 | ............. | G01V 1/307 |
| CN | 117518265 B | * | 10/2024 | ............. | G01V 1/307 |
| CN | 116482759 B | * | 9/2025 | ............. | G01V 1/307 |

* cited by examiner

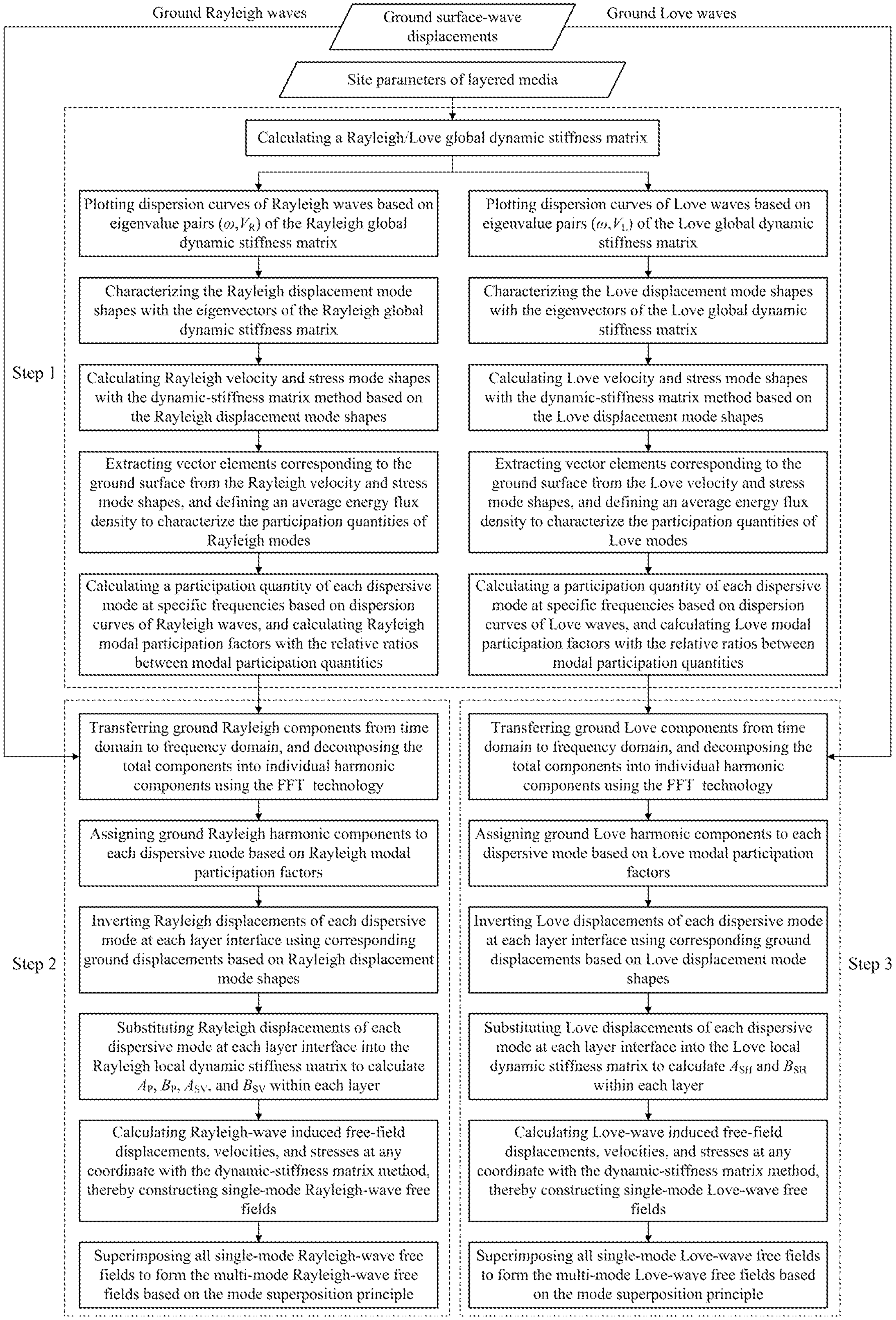
Ground surface-wave displacements
Ground Rayleigh waves
Ground Love waves
Site parameters of layered media
Calculating a Rayleigh/Love global dynamic stiffness matrix
Plotting dispersion curves of Rayleigh waves based on eigenvalue pairs ($\omega$,$V_R$) of the Rayleigh global dynamic stiffness matrix
Plotting dispersion curves of Love waves based on eigenvalue pairs ($\omega$,$V_L$) of the Love global dynamic stiffness matrix
Characterizing the Rayleigh displacement mode shapes with the eigenvectors of the Rayleigh global dynamic stiffness matrix
Characterizing the Love displacement mode shapes with the eigenvectors of the Love global dynamic stiffness matrix
Step 1
Calculating Rayleigh velocity and stress mode shapes with the dynamic-stiffness matrix method based on the Rayleigh displacement mode shapes
Calculating Love velocity and stress mode shapes with the dynamic-stiffness matrix method based on the Love displacement mode shapes
Extracting vector elements corresponding to the ground surface from the Rayleigh velocity and stress mode shapes, and defining an average energy flux density to characterize the participation quantities of Rayleigh modes
Extracting vector elements corresponding to the ground surface from the Love velocity and stress mode shapes, and defining an average energy flux density to characterize the participation quantities of Love modes
Calculating a participation quantity of each dispersive mode at specific frequencies based on dispersion curves of Rayleigh waves, and calculating Rayleigh modal participation factors with the relative ratios between modal participation quantities
Calculating a participation quantity of each dispersive mode at specific frequencies based on dispersion curves of Love waves, and calculating Love modal participation factors with the relative ratios between modal participation quantities
Transferring ground Rayleigh components from time domain to frequency domain, and decomposing the total components into individual harmonic components using the FFT technology
Transferring ground Love components from time domain to frequency domain, and decomposing the total components into individual harmonic components using the FFT technology
Assigning ground Rayleigh harmonic components to each dispersive mode based on Rayleigh modal participation factors
Assigning ground Love harmonic components to each dispersive mode based on Love modal participation factors
Step 2
Inverting Rayleigh displacements of each dispersive mode at each layer interface using corresponding ground displacements based on Rayleigh displacement mode shapes
Inverting Love displacements of each dispersive mode at each layer interface using corresponding ground displacements based on Love displacement mode shapes
Step 3
Substituting Rayleigh displacements of each dispersive mode at each layer interface into the Rayleigh local dynamic stiffness matrix to calculate $A_P$, $B_P$, $A_{SV}$, and $B_{SV}$ within each layer
Substituting Love displacements of each dispersive mode at each layer interface into the Love local dynamic stiffness matrix to calculate $A_{SH}$ and $B_{SH}$ within each layer
Calculating Rayleigh-wave induced free-field displacements, velocities, and stresses at any coordinate with the dynamic-stiffness matrix method, thereby constructing single-mode Rayleigh-wave free fields
Calculating Love-wave induced free-field displacements, velocities, and stresses at any coordinate with the dynamic-stiffness matrix method, thereby constructing single-mode Love-wave free fields
Superimposing all single-mode Rayleigh-wave free fields to form the multi-mode Rayleigh-wave free fields based on the mode superposition principle
Superimposing all single-mode Love-wave free fields to form the multi-mode Love-wave free fields based on the mode superposition principle

MULTI-MODE SURFACE-WAVE FREE-FIELD INVERSION METHOD BASED ON DISPERSION PROPERTIES OF LAYERED MEDIA

TECHNICAL FIELD

The present invention relates to the field of surface wavefield inversion, and relates to the multi-mode surface-wave free-field inversion method based on dispersion properties of layered media.

BACKGROUND

Reasonable seismic input mechanisms and accurate earthquake excitation are the preconditions for structural seismic analysis and design. Underground structures such as tunnels, subways, and pipelines, as well as deep-foundation structures such as gravity dams, nuclear power plants, and urban complexes, show non-negligible soil-structure dynamic interaction with surrounding soils when subjected to earthquakes, known as soil-structure interaction (SSI) systems. To realize the seismic input of SSI systems and truly reflect a failure mechanism of structures, various methods including the wave propagation excitation method, artificial boundary substructure method, and domain reduction method (DRM) method have gradually developed a general input mechanism that converts underground free fields into the equivalent earthquake loads on the artificial boundary of truncated soils. It is clear that the underground free fields serve as the source of seismic excitation, the accuracy of which will directly affect the final seismic response results of SSI systems. However, most earthquake recordings collected in the engineering practice are ground motions. Due to a lack of underground motions, the underground free fields are generally unavailable. Therefore, it is necessary to invert unknown underground free fields for seismic input by known ground motions and local site conditions.

According to the phase composition of seismic waves, the underground free fields are composed of two parts: body-wave free fields and surface-wave (Rayleigh and Love) free fields. For SSI systems, their foundations are usually buried within the depth range of one wavelength of surface waves, and the influence of the surface waves cannot be ignored. In layered media that is more typical and common in engineering applications, surface waves exhibit unique dispersion properties: the propagation phase velocity of surface waves is related to the frequency, with harmonic components of different frequency components exhibiting different propagation velocities. As shown in dispersion curves plotted by propagation velocities and frequencies, surface waves are characterized by multiple dispersive modes. Specifically, there existing propagation patterns of both fundamental and higher dispersive modes for high-frequency components of surface waves. The contribution of higher modes is significant, particularly in layered media of weak-interbed type. Consequently, it is crucial to take the joint effect of multiple dispersive modes into account when inverting surface waves in layered media. However, currently available studies only focus on the fundamental mode while ignoring the influence of higher modes, which results in unreasonable seismic input and subsequently inaccurate response assessment in the analysis of SSI systems.

Rocking motions associated with Rayleigh waves and torsion motions associated with Love waves have a significant influence on the seismic response of structures, respectively. Considering the dispersion properties of surface waves in layered media, the multi-mode joint inversion of surface waves is of great significance in improving the inversion accuracy and the seismic input of soil-structure interaction systems.

SUMMARY

The present invention provides a multi-mode surface-wave free-field inversion method based on dispersion properties of layered media to address the inaccuracy in existing inversion methods that ignore higher dispersive modes.

The present invention has the following technical solution:

With the multi-mode dispersion properties of surface waves, a novel approach for characterizing the modal participation quantity of each mode is proposed based on an energy flux density, which converts the propagation kinematics of surface waves into dynamics of soil particles within layered media; and the energy flux density is used to calculate a modal participation factor in combination with dispersion curves of surface waves and the frequency-domain dynamic stiffness matrix; then the ground surface-wave components with dispersion properties are transferred from the time domain to the frequency domain and decomposed into harmonic components composed of a single frequency by the Fast Fourier Transform (FFT) technology: these harmonic components are then decoupled as multiple dispersive modes by the mode participation factors, with each single-mode component being inverted to construct corresponding single-mode surface-wave free fields; and finally, all single-mode surface-wave free fields are superimposed following the mode superposition principle to form multi-mode surface-wave free fields.

A multi-mode surface-wave free-field inversion method based on dispersion properties of layered media, comprising the following steps:

Step 1: defining an average energy flux density of surface waves to characterize the participation quantity of each dispersive mode; and calculating a corresponding modal participation factor in combination with the frequency-domain dynamic stiffness matrix method and dispersion curves of surface waves, with a main process as follows:

1.1. Establishing a Rayleigh/Love global dynamic stiffness matrix in the frequency domain based on soil parameters of layered media, and calculating eigenvalues and eigenvectors of the matrix;

1.2. Plotting dispersion curves of Rayleigh waves and Love waves based on the calculated eigenvalues, which are constituted by a frequency ω and Rayleigh velocity $V_R$ for Rayleigh waves and a frequency ω and Love velocity $V_L$ for Love waves, respectively; and characterizing displacement mode shapes of respective surface waves along layer interfaces of layered media by matrix's eigenvectors;

1.3. Using Equation (1) to define the average energy flux density $\overline{P}_k$ of surface waves:

$$\overline{P}_k = \frac{\omega}{2\pi}\int_0^{2\pi/\omega} T_{kl}(t)\dot{U}_l(t)dt \tag{1}$$

where $T_{kl}(t)$ and $\dot{U}_l(t)$ are tensor time histories of soil particles' stresses and velocities subjected to surface waves, respectively; and k and l represent directional dimensions X, Y, and Z;

1.4. Calculating the free-field velocities $$\dot{U}_X^j$$

and free-field stresses $$\sigma_X^j$$

induced by Rayleigh waves with the frequency-domain dynamic stiffness matrix method:

$$\begin{cases} U_X^j(x, z, \omega) = \left\{l_x\left[A_P^j e^{i\omega\bar{s}z/V_R^*} + B_P^j e^{-i\omega\bar{s}z/V_R^*}\right] - \right. \\ \left. m_x\tilde{t}\left[A_{SV}^j e^{i\omega\bar{s}z/V_R^*} - B_{SV}^j e^{-i\omega\bar{s}z/V_R^*}\right]\right\}e^{-i\omega x/V_R^*} \\ U_Z^j(x, z, \omega) = \left\{-l_x\tilde{s}\left[A_P^j e^{i\omega\bar{s}z/V_R^*} - B_P^j e^{-i\omega\bar{s}z/V_R^*}\right] - \right. \\ \left. m_x\left[A_{SV}^j e^{i\omega\bar{s}z/V_R^*} + B_{SV}^j e^{-i\omega\bar{s}z/V_R^*}\right]\right\}e^{-i\omega x/V_R^*} \end{cases} \tag{2}$$

$$\dot{U}_X^j(x, z, \omega) = i\omega U_X^j(x, z, \omega) \tag{3}$$

$$\sigma_X^j(x, z, \omega) = (\lambda^* + 2\mu^*)\frac{\partial U_X^j(x, z, \omega)}{\partial x} + \lambda^*\frac{\partial U_Z^j(x, x, \omega)}{\partial z} \tag{4}$$

where superscript j represents the sublayer number in layered media;

$$U_X^j \text{ and } U_Z^j$$

are free-field horizontal and vertical displacements induced by Rayleigh waves in the $j^{th}$ layer, respectively;

$$A_P^j \text{ and } A_{SV}^j$$

represent incident displacement amplitudes of inhomogeneous P-waves and SV-waves in the $j^{th}$ layer;

$$B_P^j \text{ and } B_{SV}^j$$

represent reflected displacement amplitudes of inhomogeneous P-waves and SV-waves in the $j^{th}$ layer; $V_R^*$ is a complex Rayleigh velocity considering the damping effect; $l_x$, $m_x$, $\tilde{s}$, and $\tilde{t}$ are parameters related to the complex Rayleigh-wave velocity, complex P-wave velocity, and complex S-wave velocity in the $j^{th}$ layer; $\lambda^*$ and $\mu^*$ are complex Lame constants of the $j^{th}$ soil layer; x and z are space coordinates; and i is an imaginary unit;

1.5. Calculating the free-field velocities $$\dot{U}_Y^j$$

and free-field stresses $$\tau_{XY}^j$$

induced by Love waves with the frequency-domain dynamic stiffness matrix method:

$$U_Y^j(x, z, \omega) = A_{SH}^j e^{i\omega\tilde{t}z/V_L^* - i\omega x/V_L^*} + B_{SH}^j e^{-i\omega\tilde{t}z/V_L^* - i\omega x/V_L^*} \tag{5}$$

$$\dot{U}_Y^j(x, z, \omega) = i\omega U_Y^j(x, z, \omega) \tag{6}$$

$$\tau_{XY}^j(x, z, \omega) = \mu^*\frac{\partial U_Y^j(x, z, \omega)}{\partial x} \tag{7}$$

where $$U_Y^j$$

is a free-field horizontal displacement induced by Love waves in the $j^{th}$ layer;

$$A_{SH}^j$$

represents an incident displacement amplitude of inhomogeneous SH-waves in the $j^{th}$ layer;

$$B_{SH}^j$$

represents a reflected displacement amplitude of inhomogeneous SH-waves in the $j^{th}$ layer; and $$V_L^*$$

is a complex Love velocity considering the damping effect;

1.6. Using Equations (3) and (4) to calculate Rayleigh velocity mode shapes and stress mode shapes according to corresponding Rayleigh displacement mode shapes, respectively; and using Equations (6) and (7) to calculate Love velocity mode shapes and stress mode shapes according to corresponding Love displacement mode shapes, respectively;

1.7. Extracting vector elements corresponding to the ground surface from the Rayleigh/Love velocity and stress mode shapes of each dispersive mode, and substituting the extracted vector elements into Equation (1) to calculate the average energy flux densities $$\overline{P}_{R,m}^1 \text{ and } \overline{P}_{L,m}^1$$

for Rayleigh waves and Love waves, respectively:

$$\overline{P}^1_{R,m}(\omega)=\frac{\mathrm{Re}\left[\sigma^1_{X,m}(x=0,z=0,\omega)\right]\mathrm{Re}\left[\dot{U}^1_{X,m}(x=0,z=0,\omega)\right]+\mathrm{IM}\left[\sigma^1_{X,m}(x=0,z=0,\omega)\right]\mathrm{IM}\left[\dot{U}^1_{X,m}(x=0,z=0,\omega)\right]}{(2)} \quad (8)$$

$$\overline{P}^1_{L,m}(\omega)=\frac{\mathrm{Re}\left[\tau^1_{XY,m}(x=0,z=0,\omega)\right]\mathrm{Re}\left[\dot{U}^1_{Y,m}(x=0,z=0,\omega)\right]+\mathrm{IM}\left[\tau^1_{XY,m}(x=0,z=0,\omega)\right]\mathrm{IM}\left[\dot{U}^1_{Y,m}(x=0,z=0,\omega)\right]}{(2)} \quad (9)$$

where subscript m represents the number of dispersive modes of Rayleigh or Love waves; and Re and IM are symbols of the real part and imaginary part, respectively;

1.8. Adopting the average energy flux density of surface waves shown in step 1.7 as an index to characterize the modal participation quantity, and defining modal participation factors with the relative ratios between modal participation quantities:

$$N_{R,m}(\omega)=\frac{\overline{P}^1_{R,m}(\omega)}{\sum_{m=1}^{m=n}\overline{P}^1_{R,m}(\omega)} \quad (\omega_{nn-1}\le\omega\le\omega_{nn}) \quad (10)$$

$$N_{L,m}(\omega)=\frac{\overline{P}^1_{L,m}(\omega)}{\sum_{m=1}^{m=n}\overline{P}^1_{L,m}(\omega)} \quad (\omega_{nn-1}\le\omega\le\omega_{nn}) \quad (11)$$

where $N_{R,m}(\omega)$ and $N_{L,m}(\omega)$ are modal participation factors of any $m^{th}$ mode of Rayleigh waves and Love waves corresponding to the frequency ω, respectively; n is the total number of participation modes; and $(\omega_{nn-1}, \omega_{nn})$ represents the frequency range composed of initial frequencies of two adjacent dispersive modes nn−1 and nn in the dispersion curves;

Step 2: assigning ground Rayleigh components to each dispersive mode based on modal participation factors of Rayleigh waves: implementing an inversion algorithm to each single-mode Rayleigh component to obtain respective single-mode free fields; and superimposing all single-mode free fields to form the multi-mode Rayleigh-wave free fields based on the mode superposition principle, with a main process as follows:

2.1. transferring ground Rayleigh components that possess dispersion properties from the time domain to the frequency domain, and decomposing the total Rayleigh components into individual harmonic components using the FFT technology;

2.2. Multiplying frequency-domain horizontal displacement of each ground Rayleigh harmonic component $U_{X,R}(\omega)$ by a corresponding modal participation factor $N_{R,m}(\omega)$ to calculate the ground Rayleigh horizontal displacement assigned to each dispersive mode:

$$U^1_{X,m}(\omega)=U_{X,R}(\omega)N_{R,m}(\omega);$$

2.3. Calculating a ratio K of the first vector element in the Rayleigh horizontal displacement mode shapes and vertical displacement mode shapes for each dispersive mode, and multiplying the ratio K by $$U^1_{X,m}(\omega)$$

to calculate the ground Rayleigh vertical displacement assigned to each dispersive mode:

$$U^1_{Z,m}(\omega)=-iKU^1_{X,m}(\omega);$$

2.4. Normalizing the displacement mode shapes of Rayleigh waves, and inverting Rayleigh displacements of each dispersive mode at each layer interface according to corresponding ground Rayleigh displacements:

$$U^j_{X,m}(\omega)=\frac{\phi^j_{X,m}(\omega)}{\phi^1_{X,m}(\omega)}U^1_{X,m}(\omega) \quad (12)$$

$$U^j_{Z,m}(\omega)=\frac{\phi^j_{Z,m}(\omega)}{\phi^1_{Z,m}(\omega)}U^1_{Z,m}(\omega) \quad (13)$$

where $$U^j_{X,m}$$

is a Rayleigh horizontal displacement of the $m^{th}$ mode at the $j^{th}$ layer interface;

$$\phi^1_{X,m} \text{ and } \phi^j_{X,m}$$

represent vector element values corresponding to the $m^{th}$ mode at the ground surface and the $j^{th}$ layer interface within the horizontal displacement mode shapes, respectively;

$$U^j_{Z,m}$$

is a Rayleigh vertical displacement of the $m^{th}$ mode at the $j^{th}$ layer interface; and $$\phi^1_{Z,m} \text{ and } \phi^j_{Z,m}$$

represent vector element values corresponding to the $m^{th}$ mode at the ground surface and the $j^{th}$ layer interface within the vertical displacement mode shapes, respectively;

2.5. Substituting obtained Rayleigh displacements of each dispersive mode at each layer interface into the local dynamic stiffness matrix of Rayleigh waves to calculate $A_P$, $B_P$, $A_{SV}$, and $B_{SV}$ within each layer, and carrying out back substitution to Equations (2)-(4) to calculate Rayleigh-wave induced free-field displacements, free-field velocities, and free-field stresses at any coordinate; thereby constructing single-mode Rayleigh-wave free fields;

2.6. Superimposing all single-mode Rayleigh-wave free fields to form the multi-mode Rayleigh-wave free fields based on the mode superposition principle;

Step 3: assigning ground Love components to each dispersive mode based on modal participation factors of Love waves; implementing an inversion algorithm to each single-mode Love component to obtain respective single-mode free fields; and superimposing all single-mode free fields to form the multi-mode Love-wave free fields based on the mode superposition principle, with a main process as follows:

3.1. Transferring ground Love components that possess dispersion properties from the time domain to the frequency domain, and decomposing the total Love components into individual harmonic components using FFT technology;

3.2. Multiplying frequency-domain displacement of each ground Love harmonic component $U_{Y,L}(\omega)$ by a corresponding modal participation factor $N_{L,m}(\omega)$ to calculate the ground Love displacement assigned to each dispersive mode:

$$U^1_{Y,m}(\omega)=U_{Y,L}(\omega)N_{L,m}(\omega);$$

3.3. Normalizing the displacement mode shapes of Love waves, and inverting Love displacement of each dispersive mode at each layer interface according to the corresponding ground Love displacement:

$$U^j_{Y,m}(\omega)=\frac{\phi^j_{Y,m}(\omega)}{\phi^1_{Y,m}(\omega)}U^1_{Y,m}(\omega) \tag{14}$$

where $$U^j_{Y,m}$$

is a Love displacement of the $m^{th}$ mode at the $j^{th}$ layer interface; and $$\phi^1_{Y,m} \text{ and } \phi^j_{Y,m}$$

represent vector element values corresponding to the $m^{th}$ mode at the ground surface and the $j^{th}$ layer interface within the displacement mode shapes, respectively:

3.4. Substituting obtained Love displacement of each dispersive mode at each layer interface into the local dynamic stiffness matrix of Love waves to calculate $A_{SH}$ and $B_{SH}$ within each layer, and carrying out back substitution to Equations (5)-(7) to calculate Love-wave induced free-field displacements, free-field velocities, and free-field stress at any coordinate; thereby constructing single-mode Love-wave free fields.

3.5. Superimposing all single-mode Love-wave free fields to form the multi-mode Love-wave free fields based on the mode superposition principle.

The present invention has the following beneficial effects:

(1) The present invention provides a multi-mode surface-wave free-field inversion method based on dispersion properties of layered media, which fully considers the multi-mode dispersion properties of surface waves. It makes up for the deficiency of considering only fundamental mode in the existing inversion methods, and greatly improves the inversion accuracy. The comparative analysis results show that inverted multi-mode free fields in layered media of stiffness-increment type, hard-interbed type, and weak-interbed type follow the real wavefield characteristics. Based on this, the present invention can provide more accurate seismic excitation for seismic analysis of SSI systems, and has important engineering applications for revealing the real failure mechanism, and failure behavior of structures.

(2) The method of the present invention introduces an index of average energy flux density to characterize the modal participation quantity of each dispersive mode of surface waves, and transforms the propagation kinematics patterns of surface waves into dynamics responses of soil particles. Furthermore, the modal participation factors are defined as the relative ratios between modal participation quantities. The present invention effectively solves the difficulty in quantitatively identifying each dispersive mode of surface waves.

Geological studies have shown that the calculated errors are very significant if considering only the fundamental mode of surface waves. Therefore, a joint influence of multiple modes should be highly considered in the inversion of surface waves in layered media, and quantitative identification of each mode is the key to achieving the multi-mode surface-wave free-field inversion. It can be seen from the dispersion curves that the fixed harmonic component of surface waves at higher frequencies is jointly composed of different dispersive modes. Among these, the fundamental mode starts at f=0 Hz, whereas higher modes start from a specific cutting frequency $f_c$. At a given frequency, the propagation velocities of surface waves increase with the number of modes. However, all dispersive modes are mixed no matter in the frequency domain or time domain, and it is difficult to identify and separate each mode quantitatively. This further results in an obstruction to accurately inverting multi-mode surface-wave free fields. The method of the present invention derives the modal participation factors of Rayleigh and Love waves by introducing the average energy flux density, thereby quantitatively determining the surface-wave components of each mode. The results of equation derivation are simple, and the calculation process is simple and efficient.

(3) The method of the present invention utilizes the mode superposition theory from structural dynamics to invert single-mode surface-wave free fields firstly in the frequency domain, and then superimpose all single-mode results to construct the multi-mode surface-wave free fields. It effectively solves the problem of multi-mode surface-wave free-field joint inversion based on dispersion properties.

Eigenvector results of the dynamic stiffness matrix of surface waves show that the eigenvectors of different modes at the same frequency are orthogonal to each other. Based on the characteristics, the method of the present invention uses the mode superposition theory to define the multi-mode free fields as a linear superposition sum of all single-mode free fields in the frequency domain, which decomposes a complex multi-mode problem into various simple single-mode problems. The process has clear physical meaning, sufficient theoretical basis, and accurate and objective results.

DESCRIPTION OF DRAWINGS

The FIGURE is the flow chart of the method of the present invention.

DETAILED DESCRIPTION

The present invention will be further described below in combination with the drawings in the embodiment of the present invention.

The first step in the FIGURE is to calculate the eigenvalues and eigenvectors of the global dynamic stiffness matrix of surface waves according to site parameters of layered media and determine the dispersion curves and the dispersive mode shapes. Then, the average energy flux density of surface waves is defined based on the elements characterizing the ground surface within velocity and stress mode shape vectors to calculate the participation quantity of each dispersive mode. Accordingly, the participation factor of each mode is determined, which lays a foundation for subsequent inversion of single-mode surface-wave free fields.

Surface waves are essentially the waveform products of inhomogeneous body waves near the ground surface. Among others, Rayleigh waves are a type of two-dimensional surface waves generated by the superposition of inhomogeneous P-waves and inhomogeneous SV-waves at the layer interface and polarized in the P-SV plane. Love waves are a type of one-dimensional surface waves generated by the superposition of inhomogeneous SH waves at the layer interface and polarized perpendicular to the P-SV plane. The polarization directions of the two types of surface waves are perpendicular to each other and independent of each other. When establishing the coordinates for layer media, it is generally assumed that the X-Z plane is the P-SV plane where Rayleigh waves are polarized, while the Y-direction is the polarization direction of Love waves. The force-displacement relationship of soil particles caused by the Rayleigh waves can be established by the dynamic stiffness matrix, as shown in Equation (15):

$$\begin{Bmatrix} F_X^j \\ iF_Z^j \\ F_X^{j+1} \\ iF_Z^{j+1} \end{Bmatrix} = [K^j]_R \begin{Bmatrix} U_X^j \\ iU_Z^j \\ U_X^{j+1} \\ iU_Z^{j+1} \end{Bmatrix} \tag{15}$$

where $$F_X^j \text{ and } F_Z^j \left(\text{and } F_X^j \text{ and } F_Z^j\right)$$

are external load amplitudes of soil particles in the $j^{th}$ layer along X and Z directions at upper (and bottom) interfaces, respectively.

$$U_X^j \text{ and } U_Z^j \left(\text{and } U_X^{j+1} \text{ and } U_Z^{j+1}\right)$$

are corresponding displacement amplitudes of soil particles in the $j^{th}$ layer along X and Z directions at upper (and bottom) interfaces, respectively. $[K^j/]_R$ is the Rayleigh local dynamic stiffness matrix of the $j^{th}$ layer, and is related to soil layer parameters and the propagation velocity of Rayleigh waves $V_R$. In order to maintain the symmetry of the $[K^j]_R$ matrix, the load and displacement amplitudes along the Z-direction are multiplied by the imaginary number i, respectively. For the underlying half-space of the layered media, the displacement and force at infinity of the bottom are zero, so that only the force-displacement dynamic relationship at the upper interface is considered, as shown in Equation (16):

$$\begin{Bmatrix} F_X^0 \\ iF_Z^0 \end{Bmatrix} = [K^0]_R \begin{Bmatrix} U_X^0 \\ iU_Z^0 \end{Bmatrix} \tag{16}$$

where $$F_X^0 \text{ and } F_Z^0$$

are external load amplitudes of soil particles at the upper interface of the underlying half-space along X and Z directions, respectively:

$$U_X^0 \text{ and } U_Z^0$$

are corresponding displacement amplitudes of soil particles at the upper interface of the underlying half-space along X and Z directions, respectively; and $[K^0]_R$ is the Rayleigh local dynamic stiffness matrix of the underlying half-space. Similarly, the force-displacement relationships of soil particles in the layered media and the underlying half-space caused by Love waves are shown in Equations (17) and (18), respectively:

$$\begin{Bmatrix} F_Y^j \\ F_Y^{j+1} \end{Bmatrix} = [K^j]_L \begin{Bmatrix} U_Y^j \\ U_Y^{j+1} \end{Bmatrix} \tag{17}$$

$$F_Y^0 = k_L^0 U_Y^0 \tag{18}$$

where $$F_Y^j \text{ and } F_Y^{j+1}$$

are external load amplitudes of soil particles in the $j^{th}$ layer along the Y-direction at the upper and bottom interfaces, respectively;

$$U_Y^j \text{ and } U_Y^{j+1}$$

are corresponding displacement amplitudes of soil particles in the $j^{th}$ layer along the Y-direction at the upper and bottom interfaces, respectively; $[K^j]_L$ is the Love local dynamic stiffness matrix of the $j^{th}$ layer, and is related to soil layer parameters and the propagation velocity of Love waves $V_L$;

$$F_Y^0$$

is the external load amplitude of soil particles along the Y-direction at the upper interface of the underlying half-space;

$$U_Y^0$$

is the displacement amplitude of soil particles along the Y-direction at the upper interface of the underlying half-space; and $$k_L^0$$

is the Love local dynamic stiffness of the underlying half-space.

According to the continuity principle for interlayer loads and displacements, the local dynamic stiffness matrices of each layer and the underlying half-space are assembled to form the global dynamic stiffness matrix, and the global force-displacement equations of the layered media are shown in Equations (19) and (20), respectively:

$$\begin{Bmatrix} F_X^1 \\ iF_Z^1 \\ F_X^2 \\ iF_Z^2 \\ \cdot \\ \cdot \\ \cdot \\ \cdot \\ \cdot \\ \cdot \\ F_X^N \\ iF_Z^N \\ F_X^0 \\ iF_Z^0 \end{Bmatrix} = \begin{bmatrix} k_{11}^1 & k_{12}^1 & k_{13}^1 & k_{14}^1 & & & & & & \\ k_{21}^1 & k_{22}^1 & k_{23}^1 & k_{24}^1 & & & & & & \\ k_{31}^1 & k_{32}^1 & k_{33}^1+k_{11}^2 & k_{34}^1+k_{12}^2 & k_{13}^2 & k_{14}^2 & & & & \\ k_{41}^1 & k_{42}^1 & k_{43}^1+k_{21}^2 & k_{44}^1+k_{22}^2 & k_{23}^2 & k_{24}^2 & & & & \\ & & k_{31}^2 & k_{32}^2 & k_{33}^2+\ldots & k_{34}^2+\ldots & \ldots & \ldots & & \\ & & k_{41}^2 & k_{42}^2 & k_{43}^2+\ldots & k_{44}^2+\ldots & \ldots & \ldots & & \\ & & & & \ldots & \ldots & \ldots+k_{11}^N & \ldots+k_{12}^N & k_{13}^N & k_{14}^N \\ & & & & \ldots & \ldots & \ldots+k_{21}^N & \ldots+k_{22}^N & k_{23}^N & k_{24}^N \\ & & & & & & k_{31}^N & k_{32}^N & k_{33}^N+k_{11}^0 & k_{34}^N+k_{12}^0 \\ & & & & & & k_{41}^N & k_{42}^N & k_{43}^N+k_{31}^0 & k_{44}^N+k_{32}^0 \end{bmatrix}_{(2N+2)x(2N+2)} \begin{Bmatrix} U_X^1 \\ iU_Z^1 \\ U_X^2 \\ iU_Z^2 \\ \cdot \\ \cdot \\ \cdot \\ \cdot \\ \cdot \\ \cdot \\ U_X^N \\ iU_Z^N \\ U_X^0 \\ iU_Z^0 \end{Bmatrix} \tag{19}$$

$[K^1]_R$, $[K^2]_R$, …, $[K^N]_R$, $[K^0]_R$ $$\begin{Bmatrix} F_Y^1 \\ F_Y^2 \\ \cdot \\ \cdot \\ \cdot \\ F_Y^N \\ F_Y^0 \end{Bmatrix} = \begin{bmatrix} k_{11}^1 & k_{12}^1 & & & \\ k_{21}^1 & k_{22}^1+k_{11}^2 & k_{12}^2 & \ldots & \\ & k_{21}^2 & k_{22}^2+\ldots & \ldots & \\ & & \ldots & \ldots+k_{11}^N & k_{12}^N \\ & & & k_{21}^N & k_{22}^N+k_{Love}^0 \end{bmatrix}_{(N+1)\times(N+1)} \begin{Bmatrix} U_Y^1 \\ U_Y^2 \\ \cdot \\ \cdot \\ \cdot \\ U_Y^N \\ U_Y^0 \end{Bmatrix} \tag{20}$$

$[K^1]_L$, $[K^2]_L$, …, $[K^N]_L$ where the external force vectors on the left side of the equations are zero. To ensure that non-zero solutions exist for the displacements in the equations' right side, the determinant of the global dynamic stiffness matrix must be equal to zero. All discrete points on the dispersion curves of the Rayleigh and Love waves are composed of eigenvalue pairs ($\omega$, $V_R$) and ($\omega$, $V_L$) of the global dynamic stiffness matrices. For every frequency $\omega$, there exist one or multiple solutions within $V_R$, which form multi-mode solution sets for dispersion curves. Additionally, the eigenvectors describing the vibration patterns of different displacement modes are mutually orthogonal. The key step for inverting multi-mode Rayleigh-wave free fields and multi-mode Love-wave free fields is to determine mode participation factors of multiple dispersive modes, thus assigning components of ground surface waves to each mode. The difficulty lies in selecting a reasonable index to characterize the participation quantity of each dispersive mode of surface waves. Such an index is supposed to be associated with two inversion conditions: the surface-wave components of the surface and the site parameters. According to the law of energy conservation, the carried energy during the propagation of surface waves is converted into mechanical energy of soil particles, which causes motions of soil particles: specifically, rocking motions associated with Rayleigh waves and torsion motions associated with Love waves. Surface waves of different dispersive modes carry varying amounts of energy, leading to distinct rocking and torsion motions. Hence, energy serves as a valuable index for characterizing the modal participation quantity within dispersive surface waves.

Average energy flux density, as one of the typical indicators to evaluate the seismic wave energy, represents the energy per unit of time through the unit area perpendicular to the direction of wave propagation, and is expressed as:

$$\overline{P}_k = \frac{\omega}{2\pi}\int_0^{2\pi/\omega} T_{kl}(t)\dot{U}_l(t)dt \tag{21}$$

where $T_{kl}(t)$ and $\dot{U}_l(t)$ are tensor time histories of soil particles' stresses and velocities subjected to surface waves, respectively. The propagation of Rayleigh waves would induce free fields of horizontal velocities $$\dot{U}_X^j$$

and vertical velocities $$\dot{U}_Z^j$$

as well as corresponding normal stresses $$\sigma_X^j$$

and shear stresses $$\tau_{XZ}^j$$

of soil particles in each layer. Therefore, the average energy flux density of Rayleigh waves in the $j^{th}$ layer can be defined as:

$$\overline{P}_R^j(x, z, \omega) = \frac{\omega}{2\pi}\int_0^{2\pi/\omega}\{\mathrm{Re}[\sigma_X^j(x, z, \omega)\exp(i\omega t)]\mathrm{Re}[\dot{U}_X^j(x, z, \omega)\exp(i\omega t)] + \mathrm{Re}[\tau_{XZ}^j(x, z, \omega)\exp(i\omega t)]\mathrm{Re}[\dot{U}_Z^j(x, z, \omega)\exp(i\omega t)]\}dt \tag{22}$$

By introducing Euler's formula $\exp(i\omega t)=\cos(\omega t)+i\sin(\omega t)$, Equation (22) can be simplified as:

$$\overline{P}_R^j(x, z, \omega) = \frac{IP(\sigma_X^j, \dot{U}_X^j) + IP(\tau_{XZ}^j, \dot{U}_Z^j)}{2} \tag{23}$$

where IP is the inner product symbol, satisfying:

$$\begin{cases} IP(\sigma_X^j, \dot{U}_X^j) = \mathrm{Re}[\sigma_X^j(x, z, \omega)]\mathrm{Re}[\dot{U}_X^j(x, z, \omega)] + \mathrm{IM}[\sigma_X^j(x, z, \omega)]\mathrm{IM}[\dot{U}_X^j(x, z, \omega)] \\ IP(\tau_{XZ}^j, \dot{U}_Z^j) = \mathrm{Re}[\tau_{XZ}^j(x, z, \omega)]\mathrm{Re}[\dot{U}_Z^j(x, z, \omega)] + \mathrm{IM}[\tau_{XZ}^j(x, z, \omega)]\mathrm{IM}[\dot{U}_Z^j(x, z, \omega)] \end{cases} \tag{24}$$

For Love waves, their propagation would induce free fields of horizontal velocities $$\dot{U}_Y^j$$

and corresponding shear stresses $$\tau_{XY}^h$$

of soil particles in each layer. Consequently, the average energy flux density of Love waves in the $j^{th}$ layer is expressed as:

$$\overline{P}_L^j(x, z, \omega) = \frac{\omega}{2\pi}\int_0^{2\pi/\omega}\mathrm{Re}[\tau_{XY}^j(x, z, \omega)\exp(i\omega t)]\mathrm{Re}[\dot{U}_Y^j(x, z, \omega)\exp(i\omega t)]dt \tag{25}$$

By introducing Euler's formula, Equation (25) can be further simplified as:

$$\overline{P}_L^j(x, z, \omega) = \frac{\mathrm{Re}[\tau_{XY}^j(x, z, \omega)]\mathrm{Re}[\dot{U}_Y^j(x, z, \omega)] + \mathrm{IM}[\tau_{XY}^j(x, z, \omega)]\mathrm{IM}[\dot{U}_Y^j(x, z, \omega)]}{2} \tag{26}$$

In Equations (23) and (26), the key to calculating the average energy flux densities of Rayleigh and Love waves lies in determining the corresponding free-field velocities and stresses, which are derived from the free-field displacements. According to the dynamic-stiffness matrix method, the frequency-domain displacement solutions of soil particles in each layer induced by the Rayleigh and Love waves are illustrated in Equations (2) and (5), respectively. By applying partial differentiation with respect to time and position in Equation (2) respectively, the free-field velocities and stresses induced by Rayleigh waves can be calculated as:

$$\begin{cases} \dot{U}_X^j(x, z, \omega) = i\omega U_X^j(x, z, \omega) \\ \dot{U}_Z^j(x, z, \omega) = i\omega U_Z^j(x, z, \omega) \end{cases} \tag{27}$$

$$\begin{cases} \sigma_X^j(x, z, \omega) = (\lambda^* + 2\mu^*)\dfrac{\partial U_x^j(x, z, \omega)}{\partial x} + \lambda^* \dfrac{\partial U_Z^j(x, z, \omega)}{\partial z} \\ \tau_{XZ}^j(x, z, \omega) = \mu^* \left[\dfrac{\partial U_X^j(x, z, \omega)}{\partial z} + \dfrac{\partial U_Z^j(x, z, \omega)}{\partial x}\right] \end{cases} \tag{28}$$

Consequently, the average energy flux density of Rayleigh waves can be calculated by substituting the free-field velocities and the stresses back into Equation (23). Similarly, by applying partial differentiation to time and position in Equation (5), the free-field velocities and stresses induced by Love waves can be calculated as shown in Equations (6) and (7), respectively. The average energy flux density of Love waves can be calculated by substituting the obtained free-field velocity and the stress back into Equation (26). The average energy flux densities of Rayleigh and Love waves are ultimately utilized to determine the dispersive mode participation factors, with a main process as follows:

i. Using Equations (27) and (28) to calculate the velocity mode shapes and stress mode shapes of Rayleigh waves according to corresponding displacement mode shapes, respectively;

ii. Using Equations (6) and (7) to calculate the velocity mode shapes and stress mode shapes of Love waves according to corresponding displacement mode shapes, respectively;

iii. Extracting vector elements corresponding to the ground surface from the velocity and stress mode shapes of each dispersive mode, and then substituting them into Equations (23) and (26) to calculate the average energy flux density of Rayleigh and Love waves by setting coordinate x=0 and z=0. Since the shear stress $$\tau_{XZ}^1 = 0$$

at the ground surface, the finally average energy flux density of Rayleigh waves is simplified as shown in Equation (8);

iv. Adopting the average energy flux density of Rayleigh/Love waves to characterize the modal participation quantity, and defining the modal participation factors with the relative ratios between modal participation quantities.

The second step in the FIGURE is to invert the multi-mode free field of Rayleigh waves. The basic idea is to (1) decompose the ground Rayleigh waves into harmonic components composed of single frequency by the FFT technology, and assign every harmonic component to each dispersive mode based on the mode participation factors of Rayleigh waves: (2) invert the single-mode Rayleigh-wave free fields with each single-mode component assigned from ground Rayleigh waves: (3) superimpose all single-mode Rayleigh-wave free fields into multi-mode Rayleigh-wave free fields based on the mode superposition principle. Specific operation steps are as follows:

i. Transferring ground Rayleigh-wave components from the time domain to the frequency domain, and decomposing the total Rayleigh components into individual harmonic components using the FFT technology;

ii. Multiplying frequency-domain horizontal displacement of each harmonic component of ground Rayleigh waves by the corresponding modal participation factor to calculate the ground Rayleigh horizontal displacement assigned to each dispersive mode.

iii. Taking the ground Rayleigh horizontal displacement assigned to each dispersive mode as a standard, and multiplying it by the ratio K of the first vector element in the Rayleigh horizontal displacement mode shapes and vertical displacement mode shapes to calculate the ground Rayleigh vertical displacement assigned to each dispersive mode.

iv. Normalizing the displacement mode shapes of Rayleigh waves, and inverting Rayleigh displacements of each dispersive mode at each layer interface according to corresponding ground Rayleigh displacement.

v. Substituting the Rayleigh displacement components of each dispersive mode at each layer interface into the local dynamic stiffness matrix to calculate $A_P$, $B_P$, $A_{SV}$ and $B_{SV}$ within each layer, and carrying out back substitution to Equations (2), (27) and (28) to calculate Rayleigh-wave induced free-field displacements, free-field velocities, and free-field stresses at any coordinate; thereby constructing single-mode Rayleigh-wave free fields.

vi. Superimposing all single-mode Rayleigh-wave free fields to form the multi-mode Rayleigh-wave free fields based on the mode superposition principle.

The third step in the FIGURE is to apply the inversion process of multi-mode free fields from Rayleigh waves to Love waves to invert multi-mode Love-wave free fields.

The invention claimed is:

1. A multi-mode surface-wave free-field inversion method based on dispersion properties of layered media, comprising the following steps:

step 1: defining an average energy flux density of surface waves to characterize the participation quantity of each dispersive mode, and calculating a corresponding modal participation factor in combination with the frequency-domain dynamic stiffness matrix method and dispersion curves of surface waves, with a main process as follows:

1.1. establishing a Rayleigh/Love global dynamic stiffness matrix in the frequency domain based on soil parameters of layered media, and calculating eigenvalues and eigenvectors of the matrix;

1.2. plotting dispersion curves of Rayleigh waves and Love waves based on the calculated eigenvalues, which are constituted by a frequency ω and Rayleigh velocity $V_R$ for Rayleigh waves and a frequency ω and Love velocity $V_L$ for Love waves, respectively; and characterizing displacement mode shapes of respective surface waves along layer interfaces of layered media by matrix's eigenvectors;

1.3. using Equation (1) to define the average energy flux density $\overline{P}_k$ of surface waves:

$$\overline{P}_k = \frac{\omega}{2\pi}\int_0^{2\pi/\omega} T_{kl}(t)\dot{U}_l(t)dt \tag{1}$$

where $T_{kl}(t)$ and $\dot{U}_l(t)$ are tensor time histories of soil particles' stresses and velocities subjected to surface waves, respectively; and k and l represent directional dimensions X, Y, and Z;

1.4. calculating the free-field velocities $$\dot{U}_X^j$$

and free-field stresses $$\sigma_X^j$$

induced by Rayleigh waves with the frequency-domain dynamic stiffness matrix method:

$$\begin{cases} U_X^j(x,z,\omega) = \{l_x[A_P^j e^{i\omega\tilde{s}z/V_R^*} + B_P^j e^{-i\omega\tilde{s}z/V_R^*}] - \\ \quad m_x\tilde{t}[A_{SV}^j e^{i\omega\tilde{t}z/V_R^*} - B_{SV}^j e^{-i\omega\tilde{t}z/V_R^*}]\}e^{-i\omega x/V_R^*} \\ U_Z^j(x,z,\omega) = \{-l_x\tilde{s}[A_P^j e^{i\omega\tilde{s}z/V_R^*} - B_P^j e^{-i\omega\tilde{s}z/V_R^*}] - \\ \quad m_x[A_{SV}^j e^{i\omega\tilde{t}z/V_R^*} - B_{SV}^j e^{-i\omega\tilde{t}z/V_R^*}]\}e^{-i\omega x/V_R^*} \end{cases} \tag{2}$$

$$\dot{U}_x^j(x,z,\omega) = i\omega U_X^j(x,z,\omega) \tag{3}$$

$$\sigma_X^j(x,z,\omega) = (\lambda^* + 2\mu^*)\frac{\partial U_X^j(x,z,\omega)}{\partial x} + \lambda^*\frac{\partial U_Z^j(x,z,\omega)}{\partial z} \tag{4}$$

where superscript j represents the sublayer number in layered media;

$$U_X^j \text{ and } U_Z^j$$

are free-field horizontal and vertical displacements induced by Rayleigh waves in the $j^{th}$ layer, respectively;

$$A_P^j \text{ and } A_{SV}^j$$

represent incident displacement amplitudes of inhomogeneous P-waves and SV-waves in the $j^{th}$ layer;

$$B_P^j \text{ and } B_{SV}^j$$

represent reflected displacement amplitudes of inhomogeneous P-waves and SV-waves in the $j^{th}$ layer; $V_R^*$ is a complex Rayleigh velocity considering the damping effect; $l_x$, $m_x$, $\tilde{s}$, and $\tilde{t}$ are parameters related to the complex Rayleigh-wave velocity, complex P-wave velocity, and complex S-wave velocity in the $j^{th}$ layer; $\lambda^*$ and $\mu^*$ are complex Lame constants of the $j^{th}$ soil layer; x and z are space coordinates; and i is an imaginary unit;

1.5. calculating the free-field velocities $$\dot{U}_Y^j$$

and free-field stresses $$\tau_{XY}^j$$

induced by Love waves with the frequency-domain dynamic stiffness matrix method:

$$U_Y^j(x,z,\omega) = A_{SH}^j e^{i\omega\tilde{t}z/V_L^* - i\omega x/V_L^*} + B_{SH}^j e^{-i\omega\tilde{t}z/V_L^* - i\omega x/V_L^*} \tag{5}$$

$$\dot{U}_Y^j(x,z,\omega) = i\omega U_Y^j(x,z,\omega) \tag{6}$$

$$\tau_{XY}^j(x,z,\omega) = \mu^*\frac{\partial U_Y^j(x,z,\omega)}{\partial x} \tag{7}$$

where $$U_Y^j$$

is a free-field horizontal displacement induced by Love waves in the $j^{th}$ layer;

$$A_{SH}^j$$

represents an incident displacement amplitude of inhomogeneous SH-waves in the $j^{th}$ layer;

$$B_{SH}^j$$

represents a reflected displacement amplitude of inhomogeneous SH-waves in the $j^{th}$ layer; and $$V_L^*$$

is a complex Love velocity considering the damping effect;

1.6. using Equations (3) and (4) to calculate Rayleigh velocity mode shapes and stress mode shapes according to corresponding Rayleigh displacement mode shapes, respectively; and using Equations (6) and (7) to calculate Love velocity mode shapes and stress mode shapes according to corresponding Love displacement mode shapes, respectively;

1.7. extracting vector elements corresponding to the ground surface from the Rayleigh/Love velocity and stress mode shapes of each dispersive mode, and substituting the extracted vector elements into Equation (1) to calculate the average energy flux densities $$\overline{P}^1_{R,m} \text{ and } \overline{P}^1_{L,m}$$

for Rayleigh waves and Love waves, respectively:

$$\overline{P}^1_{R,m}(\omega) = \frac{\mathrm{Re}\left[\sigma^1_{X,m}(x=0, z=0, \omega)\right]\mathrm{Re}\left[\dot{U}^1_{X,m}(x=0, z=0, \omega)\right] + \mathrm{IM}\left[\sigma^1_{X,m}(x=0, z=0, \omega)\right]\mathrm{IM}\left[\dot{U}^1_{X,m}(x=0, z=0, \omega)\right]}{2} \quad (8)$$

$$\overline{P}^1_{L,m}(\omega) = \frac{\mathrm{Re}\left[\tau^1_{XY,m}(x=0, z=0, \omega)\right]\mathrm{Re}\left[\dot{U}^1_{Y,m}(x=0, z=0, \omega)\right] + \mathrm{IM}\left[\tau^1_{XY,m}(x=0, z=0, \omega)\right]\mathrm{IM}\left[\dot{U}^1_{Y,m}(x=0, z=0, \omega)\right]}{2} \quad (9)$$

where subscript m represents the number of dispersive modes of Rayleigh or Love waves; and Re and IM are symbols of real part and imaginary part, respectively;

1.8. adopting the average energy flux density of surface waves shown in step 1.7 as an index to characterize the modal participation quantity, and defining modal participation factors with the relative ratios between modal participation quantities:

$$N_{R,m}(\omega) = \frac{\overline{P}^1_{R,m}(\omega)}{\sum_{m=1}^{m=n} \overline{P}^1_{R,m}(\omega)} \quad (\omega_{nn-1} \le \omega \le \omega_{nn}) \quad (10)$$

$$N_{L,m}(\omega) = \frac{\overline{P}^1_{L,m}(\omega)}{\sum_{m=1}^{m=n} \overline{P}^1_{L,m}(\omega)} \quad (\omega_{nn-1} \le \omega \le \omega_{nn}) \quad (11)$$

where $N_{R,m}(\omega)$ and $N_{L,m}(\omega)$ are the modal participation factors of any $m^{th}$ mode of Rayleigh waves and Love waves corresponding to the frequency $\omega$, respectively; n is the total number of participation modes; and $(\omega_{nn-1}, \omega_{nn})$ represents the frequency range composed of initial frequencies of two adjacent dispersive modes nn−1 and nn in the dispersion curves;

step 2: assigning ground Rayleigh components to each dispersive mode based on modal participation factors of Rayleigh waves; implementing an inversion algorithm to each single-mode Rayleigh component to obtain respective single-mode free fields; and superimposing all single-mode free fields to form the multi-mode Rayleigh-wave free fields based on the mode superposition principle;

step 3: assigning ground Love components to each dispersive mode based on modal participation factors of Love waves; implementing an inversion algorithm to each single-mode Love component to obtain respective single-mode free fields; and superimposing all single-mode free fields to form the multi-mode Love-wave free fields based on the mode superposition principle.

2. The multi-mode surface-wave free-field inversion method based on dispersion properties of layered media according to claim 1, wherein the specific operation of the step 2 is as follows:

2.1. transferring ground Rayleigh components that possess dispersion properties from the time domain to the frequency domain, and decomposing the total Rayleigh components into individual harmonic components using the Fast Fourier Transform (FFT) technology;

2.2. multiplying frequency-domain horizontal displacement of each ground Rayleigh harmonic component $U_{X,R}(\omega)$ by a corresponding modal participation factor $N_{R,m}(\omega)$ to calculate the ground Rayleigh horizontal displacement assigned to each dispersive mode:

$$U^1_{X,m}(\omega) = U_{X,R}(\omega) N_{R,m}(\omega);$$

2.3. calculating a ratio K of the first vector element in the Rayleigh horizontal displacement mode shapes and vertical displacement mode shapes for each dispersive mode, and multiplying the ratio K by $$U^1_{X,m}(\omega)$$

to calculate the ground Rayleigh vertical displacement assigned to each dispersive mode:

$$U^1_{Z,m}(\omega) = -iKU^1_{X,m}(\omega);$$

2.4. normalizing the displacement mode shapes of Rayleigh waves, and inverting Rayleigh displacements of each dispersive mode at each layer interface according to corresponding ground Rayleigh displacements:

$$U^j_{X,m}(\omega) = \frac{\phi^j_{X,m}(\omega)}{\phi^1_{X,m}(\omega)} U^1_{X,m}(\omega) \quad (12)$$

$$U^j_{Z,m}(\omega) = \frac{\phi^j_{Z,m}(\omega)}{\phi^1_{Z,m}(\omega)} U^1_{Z,m}(\omega) \quad (13)$$

where $$U^j_{X,m}$$

is a Rayleigh horizontal displacement of the $m^{th}$ mode at the $j^{th}$ layer interface;

$$\phi^1_{X,m} \text{ and } \phi^j_{X,m}$$

represent vector element values corresponding to the $m^{th}$ mode at the ground surface and the $j^{th}$ layer interface within the horizontal displacement mode shapes, respectively;

$$U^j_{Z,m}$$

is a Rayleigh vertical displacement of the $m^{th}$ mode at the $j^{th}$ layer interface; and $$\phi_{Z,m}^{1} \text{ and } \phi_{Z,m}^{j}$$

represent vector element values corresponding to the $m^{th}$ mode at the ground surface and the $j^{th}$ layer interface within the vertical displacement mode shapes, respectively;

2.5. substituting obtained Rayleigh displacements of each dispersive mode at each layer interface into the local dynamic stiffness matrix of Rayleigh waves to calculate $A_P$, $B_P$, $A_{SV}$, and $B_{SV}$ within each layer, and carrying out back substitution to Equations (2)-(4) to calculate Rayleigh-wave induced free-field displacements, free-field velocities, and free-field stresses at any coordinate; thereby constructing single-mode Rayleigh-wave free fields;

2.6. superimposing all single-mode Rayleigh-wave free fields to form the multi-mode Rayleigh-wave free fields based on the mode superposition principle.

3. The multi-mode surface-wave free-field inversion method based on dispersion properties of layered media according to claim 1, wherein the specific operation of the step 3 is as follows:

3.1. transferring ground Love components that possess dispersion properties from the time domain to the frequency domain, and decomposing the total Love components into individual harmonic components using the FFT technology;

3.2. multiplying frequency-domain displacement of each ground Love harmonic component $U_{Y,L}(\omega)$ by a corresponding modal participation factor $N_{L,m}(\omega)$ to calculate the ground Love displacement assigned to each dispersive mode:

$$U_{Y,m}^{1}(\omega) = U_{Y,L}(\omega)N_{L,m}(\omega);$$

3.3. normalizing the displacement mode shapes of Love waves, and inverting Love displacement of each dispersive mode at each layer interface according to the corresponding ground Love displacement:

$$U_{Y,m}^{j}(\omega) = \frac{\phi_{Y,m}^{j}(\omega)}{\phi_{Y,m}^{1}(\omega)} U_{Y,m}^{1}(\omega) \tag{14}$$

where $$U_{Y,m}^{j}$$

is a Love displacement of the $m^{th}$ mode at the $j^{th}$ layer interface; and $$\phi_{Y,m}^{1} \text{ and } \phi_{Y,m}^{j}$$

represent vector element values corresponding to the $m^{th}$ mode at the ground surface and the $j^{th}$ layer interface within the displacement mode shapes, respectively;

3.4. substituting obtained Love displacement of each dispersive mode at each layer interface into the local dynamic stiffness matrix of Love waves to calculate $A_{SH}$ and $B_{SH}$ within each layer, and carrying out back substitution to Equations (5)-(7) to calculate Love-wave induced free-field displacements, free-field velocities, and free-field stresses at any coordinate; thereby constructing single-mode Love-wave free fields;

3.5. superimposing all single-mode Love-wave free fields to form the multi-mode Love-wave free fields based on the mode superposition principle.

* * * * *